United States Patent [19]

Butler et al.

[11] Patent Number: 5,873,431

[45] Date of Patent: *Feb. 23, 1999

[54] ARTICULATED VEHICLE

[75] Inventors: Daniel N. Butler, Franklin; George A. Fischer; Randall W. Welker, both of Grove City, all of Pa.

[73] Assignee: Joy MM Delaware, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 642,571

[22] Filed: May 3, 1996

[51] Int. Cl.$^6$ ........................................... B62D 11/00
[52] U.S. Cl. ........................... 180/418; 280/419; 280/494
[58] Field of Search .................................... 280/418, 419, 280/492, 493, 494, 498; 180/14.2, 9.4, 418

[56] References Cited

U.S. PATENT DOCUMENTS

| | | |
|---|---|---|
| 1,610,902 | 12/1926 | Tomlinson . |
| 2,179,955 | 11/1939 | Rawnsley . |
| 3,035,654 | 5/1962 | Nuttall, Jr. et al. . |
| 3,349,931 | 10/1967 | Wagner . |
| 3,356,173 | 12/1967 | Holcombe . |
| 3,525,539 | 8/1970 | Illar . |
| 3,777,915 | 12/1973 | Reed . |
| 3,826,387 | 7/1974 | Galis . |
| 3,908,841 | 9/1975 | Lee et al. . |
| 4,011,957 | 3/1977 | Bendsten . |
| 4,043,588 | 8/1977 | Curry . |
| 4,090,627 | 5/1978 | Teti . |
| 4,212,365 | 7/1980 | Curry . |
| 4,245,714 | 1/1981 | Kersey . |
| 4,290,622 | 9/1981 | Horvath ................................ 280/492 |
| 4,471,850 | 9/1984 | Rotz . |
| 4,588,199 | 5/1986 | Fisher ................................... 280/492 |
| 4,711,461 | 12/1987 | Fromberg .............................. 280/494 |
| 4,890,684 | 1/1990 | Simmons . |
| 5,632,350 | 5/1997 | Gauvin .................................. 180/418 |

FOREIGN PATENT DOCUMENTS

| | | |
|---|---|---|
| 1175868 | 10/1984 | Canada . |
| 509466 | 8/1976 | U.S.S.R. . |
| 1525030 | 11/1989 | U.S.S.R. . |

*Primary Examiner*—Anthony Knight
*Assistant Examiner*—John L. Beres
*Attorney, Agent, or Firm*—Kirkpatrick & Lockhart LLP

[57] ABSTRACT

An articulated vehicle comprising a first vehicle portion attached to a second vehicle portion by a joint assembly. The joint assembly preferably comprises a bearing assembly that is pivotally attached to the first vehicle portion such that the bearing assembly can pivot relative to the first vehicle portion about a substantially horizontal axis that is substantially transverse to the longitudinal axis of the vehicle. The bearing assembly is also preferably pivotally attached to the second vehicle portion such that the bearing assembly can pivot relative to the second vehicle portion about a substantially vertical axis. The bearing assembly is preferably constructed to enable the first vehicle portion to rotate about the longitudinal axis relative to the second vehicle portion.

8 Claims, 4 Drawing Sheets

ARTICULATED VEHICLE

BACKGROUND OF THE INVENTION

1. Field of Invention

The present invention relates to mobile vehicles and, more particularly, is directed to articulated material handling vehicles used in underground mining operations.

2. Description of the Invention Background

In mining operations, especially in the underground mining of coal and the like, a variety of conveying apparatuses are used to transport the mined material from the mining machine to a final destination wherein they can be transported from the mine. During the early stages of mine development, main haulageways are created within the mine and often support stationary belt conveyors for transporting the mined material from the mine or a remote collection area. A variety of different conveying systems and apparatuses have been developed for transferring the mined material from the mining machine to the main belt conveyors or staging areas.

One type of apparatus that is used to transport mined material within a mine between a mining machine or staging area and a conveyor network which ultimately transfers the material out of the mine is known as a shuttle car. In the past, conventional shuttle cars typically comprised wheeled vehicles that were equipped with material-receiving containers. The car was usually electrically powered through cables attached to a remote power source and steered by an operator that rode on the vehicle.

The utility of those early cars was often limited due to their inability to negotiate "tight" corners between the intersecting passages cut within the mine. Thus, the overall size (i.e., width and length) of the car was confined to dimensions that would permit the car to travel between intersecting passages. Therefore, the payload capacity of such a shuttle car was limited.

In more recent years, articulated cars have been developed in an effort to increase the hauling capacity of the car while improving its maneuverability. Early articulated shuttle cars typically included a front tractor portion that housed batteries and supported the operator and a rear container portion that was attached to the tractor portion by an articulated joint arrangement. Examples of such cars are disclosed in U.S. Pat. No. 3,826,387 to Galis, U.S. Pat. No. 3,827,721 to Coval, U.S. Pat. No. 4,011,957 to Bendtsen, U.S. Pat. No. 4,212,365 to Curry, U.S. Pat. No. 4,245,714 to Kersey and U.S. Pat. No. 4,890,684 to Simmons.

To enhance the vehicle's maneuverability within a mine where uneven floor conditions are typically present, it is desirable for the vehicle portions to freely rotate relative to each other about the vehicle's longitudinal axis. Also, to enable the vehicle to traverse undulations in the mine floor, it is desirable for the vehicle portions to be capable of pivoting about an axis that is transverse to the longitudinal axis. Furthermore, to enable the vehicle to negotiate relatively sharp corners within a confined space such as an underground mine, it is desirable for the vehicle portions to be capable of being selectively pivotable relative to each other about a vertical axis.

Some prior vehicles have some of the above-mentioned capabilities. However, due to their particular joint construction, such variable articulation is somewhat limited. For example, U.S. Pat. No. 3,826,387 to Galis discloses an articulated haulage vehicle that has a hopper portion that is pivotally attached to a prime mover portion such that the two portions are capable of selective pivotal motion about a vertical axis by a pair of hydraulic cylinders. The vehicle is not equipped to "roll" about a longitudinal axis or pivot about a horizontal axis.

U.S. Pat. No. 3,827,721 to Coval discloses an articulated haulage vehicle that has a front portion and a rear portion that are connected together by spherical bearing arrangements that permit the vehicle sections to pivot about a plurality of axes in response to undulations in the mine floor. Such spherical bearing arrangements, however, are typically not well-suited for the rigors of underground mining and often fail prematurely and/or require frequent maintenance or repair.

Another articulated material handling vehicle is disclosed in U.S. Pat. No. 4,011,957 to Bendtsen and includes a rear trailer unit that is pivotally attached to a front tractor unit by a hitch assembly. The hitch assembly includes a vertically arranged pivotal coupling that permits the trailer and tractor portions to be pivoted about a vertical axis by a pair of jacks. The hitch assembly also includes a horizontally arranged pivotal coupling that enables the tractor and trailer to pivot about a longitudinal axis of oscillation. This joint arrangement, however, does not permit the tractor and trailer to pivot relative to each other about a transverse horizontal axis.

U.S. Pat. No. 4,212,365 to Curry discloses a pivot connection and a tilt mechanism for interconnecting portions of an articulated vehicle together. The pivot connection is provided between the vehicle portions to enable them to turn relative to each other. The tilt mechanism includes a horizontal pivot connection between the two vehicle portions so that vertical movement of at least a portion of one vehicle adjacent to the horizontal pivot connection will move a portion of the other vehicle adjacent to the pivot connection in the same direction and cause the other vehicle to pivot about the axis of its wheels. This joint arrangement, however, does not permit the vehicle sections to pivot about a longitudinal axis.

U.S. Pat. No. 4,245,714 to Kersey discloses an articulated mining vehicle that includes front and rear vehicle portions connected by a "floating" connector member. The connector member has upper and lower vertically aligned pivot connections attached to the rear vehicle portion and horizontally aligned front and rear pivot connections attached to the front vehicle portion. This joint arrangement utilizes a plurality of spherical bearings which tend to fail under normal service loads.

U.S. Pat. No. 4,890,684 to Simmons discloses an articulated vehicle with a hinged joint that enables the portions of the vehicle to pivot relative to each other about three axes extending at right angles to each other. A hydraulically operated strut extends between the two vehicle sections and is universally pivoted at its ends to the two vehicle sections to control the relative pivoting of the two vehicle sections about a transverse axis while enabling the middle of the vehicle to be raised or lowered for various reasons. The vehicle is steered by a pair of hydraulically operated steering struts. The hydraulically actuated struts are connected to the vehicle sections by spherical bearing arrangements that are susceptible to failing under normal operating loads.

Other joint arrangements for articulated vehicles are disclosed in U.S. Pat. No. 1,610,902 to Tomlinson, U.S. Pat. No. 3,773,129 to Anderson, U.S. Pat. No. 2,179,955 to Rawnsley and U.S. Pat. No. 3,035,654 to Nuttall, Jr. et al. However, none of those patents disclose a joint arrangement that enables the vehicle sections to pivot relative to each other about a longitudinal axis, a vertical axis and a transverse horizontal axis and that is reliable and easy to maintain.

Accordingly, there is a need for a joint arrangement for an articulated vehicle that enables the vehicle portions to pivot relative to each other about a longitudinal axis, a vertical axis and a transverse horizontal axis that is capable of withstanding the abuse commonly encountered during underground mining operations and that is easy to access for maintenance purposes.

SUMMARY OF THE INVENTION

In accordance with a particular preferred form of the present invention, there is provided an articulated vehicle that has a longitudinal axis. The vehicle preferably comprises a first vehicle portion and a second vehicle portion that are interconnected along the longitudinal axis by a joint assembly. The joint assembly preferably comprises a bearing assembly that is pivotally attached to the first vehicle portion such that the bearing assembly can pivot relative to the first vehicle portion about a substantially horizontal axis substantially transverse to the longitudinal axis. The bearing assembly is also preferably pivotally attached to the second vehicle portion such that the bearing assembly can pivot relative to the second vehicle portion about a substantially vertical axis. The bearing assembly enables the first vehicle portion to rotate about the longitudinal axis relative to the second vehicle portion.

It is an object of the present invention to provide an improved articulated haulage vehicle that employs a relatively compact joint assembly which permits the vehicle to negotiate relatively tight corners within the confines of an underground mine.

It is another object of the present invention to provide an articulated haulage vehicle with the above mentioned attributes that is capable of accommodating undulations in the mine floor.

It is still another object of the present invention to provide a joint assembly for an articulated haulage vehicle that can withstand the abuse commonly encountered by underground mining machinery.

It is yet another object of the present invention to provide a joint assembly for an articulated haulage vehicle that is easy to access and maintain.

Another object of the present invention is to provide a compact joint assembly that has the above-mentioned attributes and, due to its compactness, enables larger haulage containers to be employed to provide the vehicle with a haulage capacity that is larger than the haulage capacities of prior articulated shuttle cars.

Accordingly, the present invention provides solutions to the aforementioned problems commonly encountered when using prior haulage vehicles cars. The unique compact design of the joint assembly of the present invention enables the haulage vehicle to easily negotiate relatively tight corners within a confined area without sacrificing haulage capacity. The subject invention also employs components that are typically more reliable than the components employed in prior joint arrangements and, can be easily accessed for maintenance purposes. These and other details, objects and advantages will become apparent as the following detailed description of the present preferred embodiments thereof proceeds.

BRIEF DESCRIPTION OF THE DRAWINGS

In the accompanying drawings, there are shown present preferred embodiments of the invention wherein like reference numerals are employed to designate like parts and wherein.

DETAILED DESCRIPTION OF THE PREFERRED EMBODIMENTS

Figure 1:
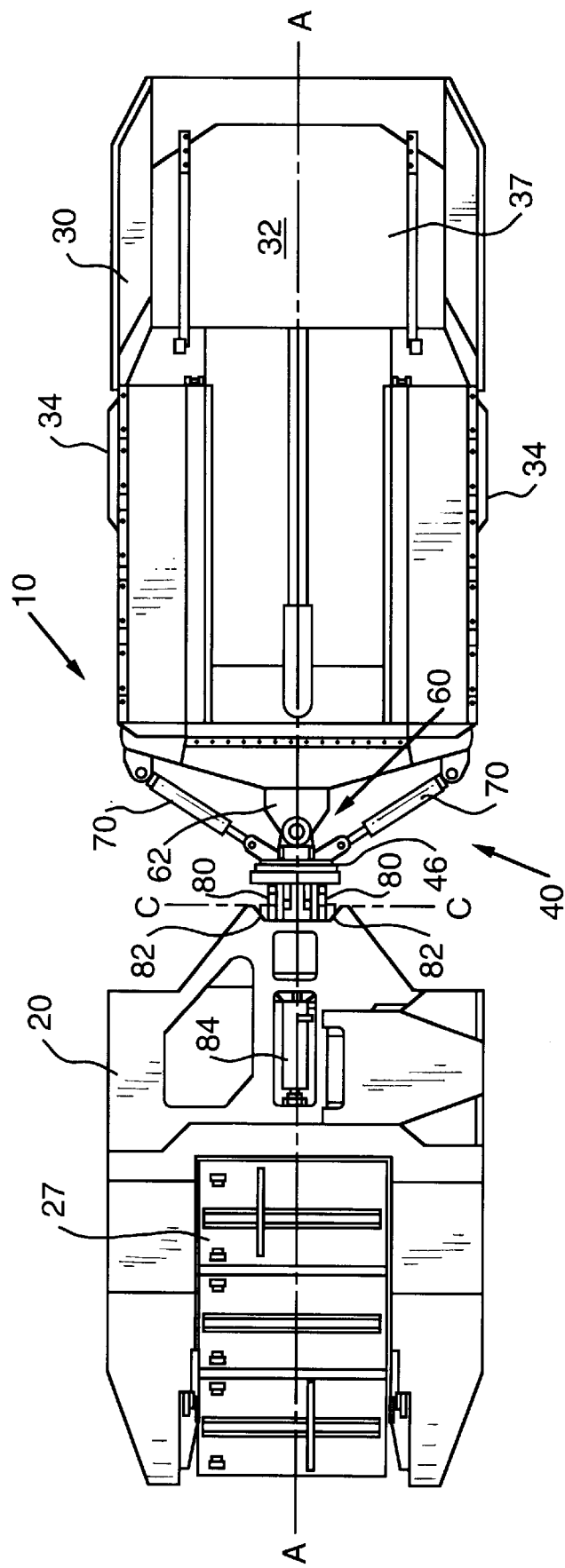
FIG. 1 is a top view of a preferred articulated vehicle of the subject invention.

Referring now to the drawings for the purposes of illustrating present preferred embodiments of the invention only and not for purposes of limiting the same, the Figures show an articulated vehicle generally designated as 10. The vehicle 10 depicted in the Figures is adapted for hauling materials within confined spaces such as underground mines. The skilled artisan will readily appreciate, however, that the joint assembly of the present invention can be successfully employed with a variety of different vehicle configurations and designs. Thus, the scope of the present invention should not be limited to articulated shuttle or haulage vehicles for underground mining operations.

Figure 2:
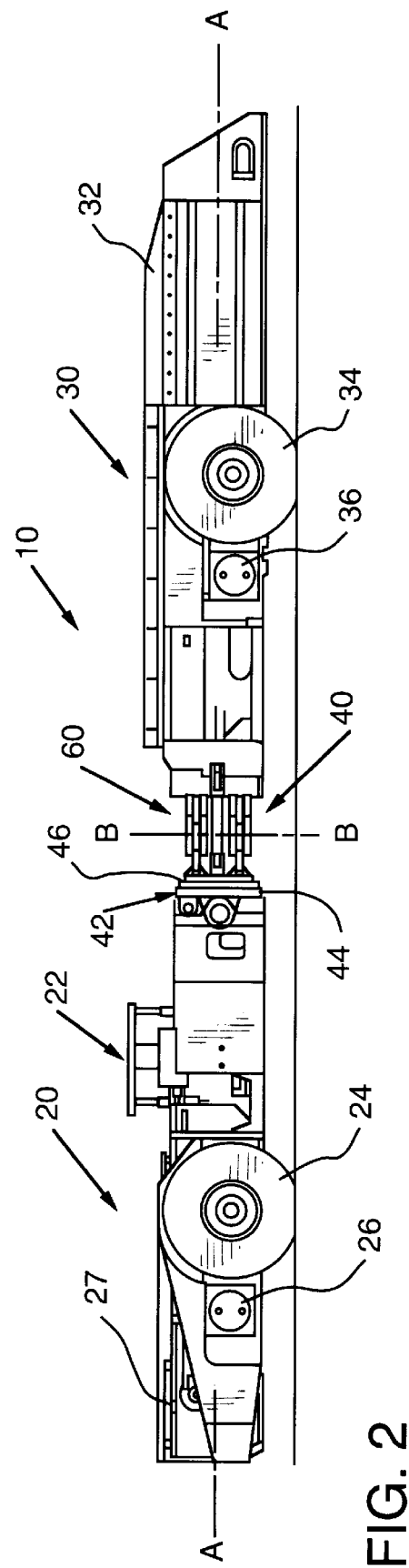
FIG. 2 is a side elevational view of the vehicle of FIG. 1.
Figure 3:
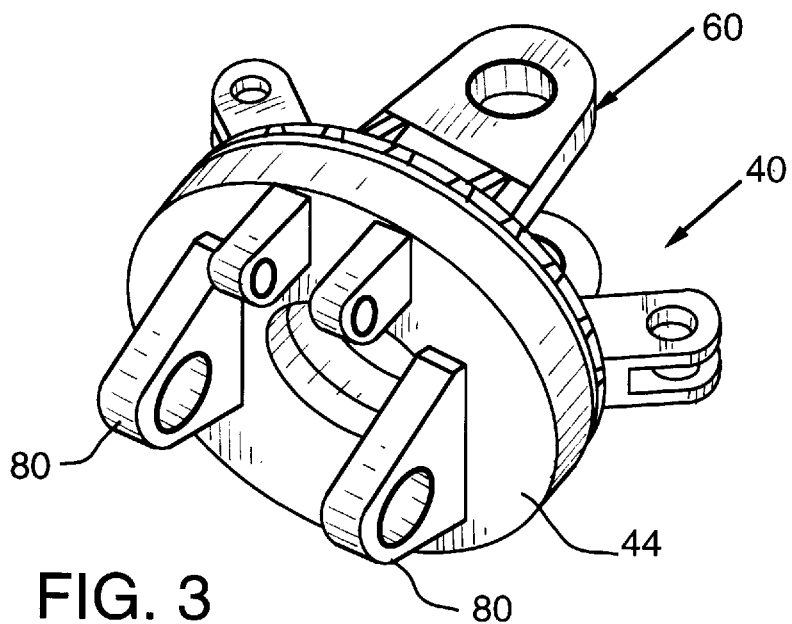
FIG. 3 is a perspective view of a preferred ball bearing assembly of the present invention.
Figure 4:
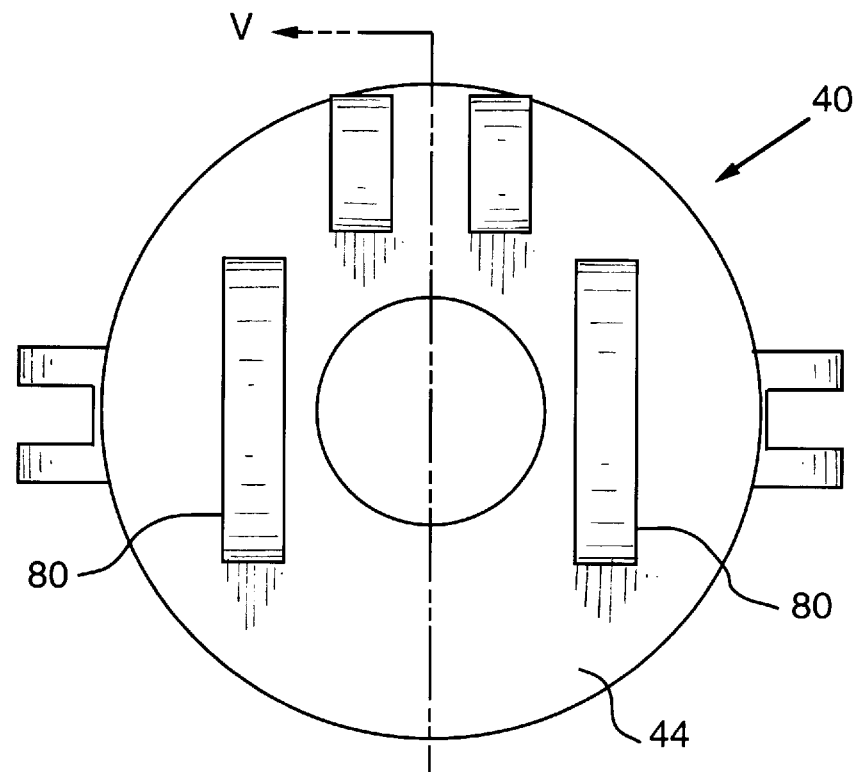
FIG. 4 is a front view of the ball bearing assembly of FIG. 3.

More particularly and with reference to FIGS. 1 and 2, there is shown an articulated vehicle 10 that has a front vehicle portion 20 and a rear vehicle portion 30. Preferably, the front vehicle portion 20 has an operator area 22 wherein a driver can be seated for driving the vehicle 10. The front portion 20 includes wheels 24 that are preferably each driven by a separate battery powered motor 26. However, a variety of different drive arrangements can be employed to drive wheels 24. The front vehicle portion 20 also preferably supports a battery pack 27 for supplying electrical power to the vehicle 10.

In a preferred embodiment, the rear vehicle portion 30 comprises a haulage container 32 adapted to receive and discharge mined materials such as coal and the like. A variety of haulage container designs are known in the art and thus, the design and construction of haulage container 32 will not be discussed in detail herein. As can be seen in FIGS. 1 and 2, however, the haulage container 32 is also equipped with a pair of wheels 34 that are preferably driven by electrically powered motors 36. The haulage container also includes a displacement member 37 for selectively moving coal or the like to the rear portion of the container.

Figure 5:
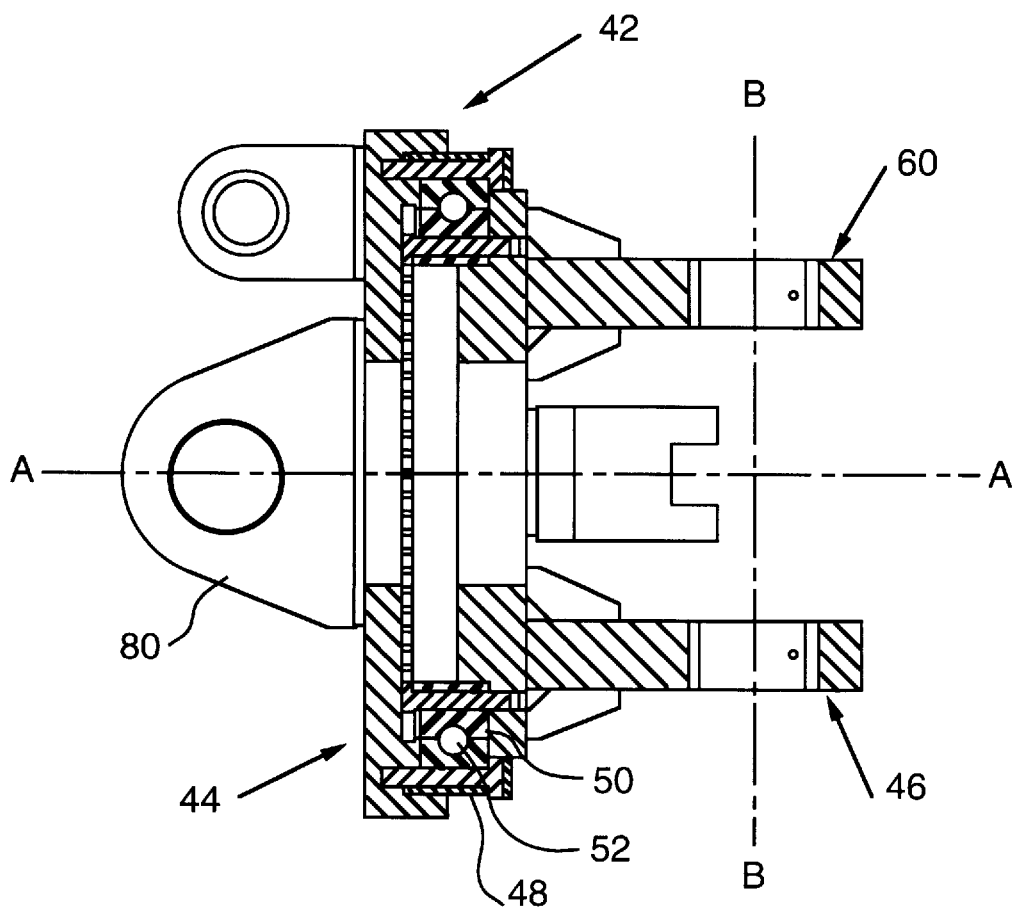
FIG. 5 is a cross-sectional view of the ball bearing assembly of FIGS. 3 and 4 taken along line V—V in FIG. 4.

The rear vehicle portion 30 is attached to the front vehicle portion 20 by a preferred joint assembly 40. Joint assembly 40 preferably comprises a ball bearing assembly 42 that is pivotally attached to the rear vehicle portion 30. As can be seen in FIG. 5, the ball bearing assembly 42 comprises a front portion 44 and a rear portion 46. As can be most particularly seen in FIG. 5, the front portion 44 has a first race portion 48 attached thereto and the rear portion 46 has a second race portion 50 attached thereto. The first and second race portions (48, 50) cooperate to form a bearing raceway, generally designated as 52 which supports a plurality of ball bearings therein. The skilled artisan will readily appreciate that such bearing construction permits the front bearing portion 44 and the rear bearing portion 46 to freely rotate relative to each other about a longitudinal axis A—A that extends through the vehicle 10.

In a preferred embodiment, the rear bearing portion 46 is pivotally attached to the rear vehicle portion 30 by a clevis assembly 60. More particularly, the rear vehicle portion 30 is equipped with a draw bar 62 that is adapted to be pinned to the clevis assembly 60. It will be appreciated that such arrangement permits the rear bearing portion 46 to pivot relative to the rear vehicle portion about a substantially vertical axis B—B. See FIG. 2.

To pivot the rear vehicle portion 30 relative to the rear bearing portion 46 about the vertical axis B-B, a pair of conventional hydraulic cylinders 70 are attached between the rear bearing portion 46 and the rear vehicle portion 30 as shown in FIG. 1. The hydraulic cylinders 70 are powered by conventional sources of pressurized hydraulic fluid and are controlled by operator's controls in operator station 22. The reader will appreciate that such arrangement permits the vehicle 10 to be steered around relatively tight corners.

The front bearing portion 44 of the ball bearing assembly 42 is preferably pinned to the front vehicleportion 20 such that the front bearing portion 44 can pivot relative to the front vehicle portion 20 about a substantially horizontal axis C—C that is transverse to the longitudinal axis A—A. See FIG. 1. The front bearing portion 44 is equipped with two spaced draw bars 80 that are adapted 0o be received in clevis assemblies 82 that are attached to the front vehicle portion. To selectively pivot the bearing assembly 40 relative to the front vehicle portion 20 about axis C—C, a hydraulic cylinder 84 is preferably attached between the front vehicle portion and the front bearing assembly as shown in FIG. 1.

Accordingly, the present invention provides solutions to the aforementioned problems associated with prior articulated vehicles. In particular, the present invention enables the front vehicle portion to "roll" relative to the rear vehicle portion about the longitudinal axis A—A to accommodate undulations in the mine floor. Furthermore, the present invention permits the front and rear vehicle portions to pivot relative to each other about a horizontal transverse axis C—C which enables the vehicle to negotiate dips in the mine floor that may otherwise cause one or both of the vehicle portions to drag on the mine floor during the negotiation thereof. In addition, the hydraulic cylinder arrangement of the present invention enables the vehicle to be steered around relatively sharp corners within the confines of an underground mine or other constrained area. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An articulated vehicle having a longitudinal axis, comprising:

a first vehicle portion;

a second vehicle portion;

a joint assembly for interconnecting said first vehicle portion to said second vehicle portion along said longitudinal axis, said joint assembly comprising a bearing assembly attached by a first pivot means to said first vehicle portion such that said bearing assembly can pivot relative to said first vehicle portion about a substantially horizontal axis substantially transverse to said longitudinal axis, said bearing assembly being attached by second pivot means to said second vehicle portion about a substantially vertical axis that does not intersect said substantially horizontal axis, said bearing assembly constructed to permit said first vehicle portion to rotate about said longitudinal axis unrestricted by said second vehicle portion and said second vehicle portion to rotate about said longitudinal axis unrestricted by said first vehicle portion; and first displacement means attached to said first vehicle portion and said bearing assembly for selectively pivoting said bearing assembly relative to said first vehicle portion about said substantially horizontal transverse axis.

2. The articulated vehicle of claim 1 wherein said first pivot means comprises a hydraulic cylinder.

3. The articulated vehicle of claim 1 further comprising second displacement means attached to said second vehicle portion and said bearing assembly for selectively pivoting said bearing assembly relative to said second vehicle portion about said substantially vertical axis.

4. The articulated vehicle of claim 3 wherein said second pivot means comprises a pair of hydraulic cylinders.

5. The articulated vehicle of claim 1 wherein said first vehicle portion includes motivation means for motivating said articulated vehicle on a surface and wherein said second vehicle portion comprises a container for hauling materials.

6. The articulated vehicle of claim 1 wherein said bearing means comprises a ball bearing assembly.

7. An articulated shuttle car for hauling mined materials, comprising:

a first tractor portion having motivating means for moving said articulated shuttle car on a surface, said first tractor portion having means for supporting an operator thereon;

a second container portion for receiving and hauling mined material therein;

a ball bearing assembly for interconnecting said first tractor portion to said second container portion along a longitudinal axis, said ball bearing assembly attached to said first tractor portion by a first pivot means such that said ball bearing assembly can pivot relative to said first tractor portion about a substantially horizontal axis substantially transverse to said longitudinal axis, said ball bearing assembly attached to said second container portion by a second pivot means such that said ball bearing assembly can pivot relative to said second container portion about a substantially vertical axis and enabling said first tractor portion to rotate about said longitudinal axis relative to said second container portion unrestricted by said second container portion and said second vehicle portion to rotate about said longitudinal axis unrestricted by said first tractor portion a first hydraulic cylinder attached to said first tractor portion and said ball bearing assembly for selectively pivoting said ball bearing assembly relative to said first tractor portion about said substantially horizontal transverse axis; and a pair of second hydraulic cylinders attached to said second container portion and said ball bearing assembly for selectively pivoting said ball bearing assembly relative to said second container portion about said substantially vertical axis.

8. An articulated joint for attaching a tractor portion of a shuttle car to a container portion for hauling mined materials, comprising;

a ball bearing assembly attached to said tractor portion by a first pivot means such that said ball bearing assembly can pivot relative to said tractor portion about a substantially horizontal axis substantially transverse to a longitudinal axis extending the length of the shuttle car, said ball bearing assembly attached to said container portion by a second pivot means such that said ball bearing assembly can pivot relative to said container portion about a substantially vertical axis and enabling said tractor portion to rotate about said longitudinal axis relative to said container portion unrestricted by said container portion and said container portion to rotate about said longitudinal axis unrestricted by said tractor portion;

a first hydraulic cylinder attached to said tractor portion and said ball bearing assembly for selectively pivoting said ball bearing assembly relative to said tractor portion about said substantially horizontal transverse axis; and a pair of second hydraulic cylinders attached to second container portion and said ball bearing assembly for selectively pivoting said ball bearing assembly relative to said container portion about said substantially vertical axis.

\* \* \* \* \*